United States Patent [19]
Hopwood et al.

[11] 4,071,844
[45] Jan. 31, 1978

[54] FREQUENCY CONTROL FOR FREQUENCY AGILE PULSE RADAR

[75] Inventors: Francis W. Hopwood, Severna Park; Lester K. Staley, Towson; Henry D. Tolj, Lutherville, all of Md.

[73] Assignee: Westinghouse Electric Corporation, Pittsburgh, Pa.

[21] Appl. No.: 677,647

[22] Filed: Apr. 16, 1976

[51] Int. Cl.$^2$ .......................... G01S 9/02; G01S 7/28
[52] U.S. Cl. .............................. 343/17.2 R; 343/5 AF
[58] Field of Search ..................... 343/5 AF, 17.2 R

[56] References Cited

U.S. PATENT DOCUMENTS

| | | | |
|---|---|---|---|
| 2,798,946 | 7/1957 | Howery et al. | 343/5 AF X |
| 2,852,669 | 9/1958 | Ashby | 343/5 AF X |
| 3,372,391 | 3/1968 | Lerner | 343/5 AF X |
| 3,611,380 | 10/1971 | Carlsson | 343/17.2 R |
| 3,858,219 | 12/1974 | Hull | 343/17.2 R |
| 3,979,752 | 9/1976 | Charlot | 343/17.2 R |

*Primary Examiner*—Malcolm F. Hubler
*Attorney, Agent, or Firm*—H. W. Patterson

[57] ABSTRACT

An automatic frequency control for causing a local oscillator to track the frequency of a transmitter such that the received echo of a transmitted pulse may be combined with the output of the local oscillator in a mixer to provide an intermediate frequency signal which is suitable for amplification, filtering and detection operations. The automatic frequency control includes an average frequency control loop for determining the average frequency of the local oscillator output signal, an electromechanical frequency transducer cooperating with a sample and hold circuit for providing a modulating signal to modulate the average frequency of the local oscillator output signal in response to the frequency of the next pulse to be provided by the transmitter, and a modulation gain control loop for controlling the gain of the modulating signal to compensate for variations in the transfer functions of the electromechanical frequency transducer and the sample and hold circuit.

8 Claims, 2 Drawing Figures

FREQUENCY CONTROL FOR FREQUENCY AGILE PULSE RADAR

BACKGROUND OF THE INVENTION

1. Field of the Invention

The present invention relates to non-coherent, frequency agile, radar receivers and, more particularly, to frequency control mechanisms for such receivers.

2. Description of the Prior Art

Non-coherent frequency agile pulse radars are well known to those skilled in the art. In the radar art, it is well understood that targets disposed at certain aspect angles with respect to transmitted pulses of selected frequencies will produce no receivable echo at the radar antenna, thereby permitting the target to go undetected. To overcome this problem, frequency agile pulse radars have been developed which transmit pulses of variable radio frequencies, so that the radar set will not operate continuously at a selected frequency where a target disposed at a particular aspect angle would provide no echo to the receiver. The rate of variation of the radio frequency is referred to as the agility modulation rate and, typically, varies in a sinusoidal fashion.

Operating limitations of the radar receiver components require that the amplification and further processing of the received echo signals be done at intermediate frequencies rather than the radio frequencies of signals provided by the transmitter and received as echos. The conversion of the received signals from a radio frequency to an intermediate frequency is accomplished by mixing the received signals with the output of a local oscillator having a radio frequency which differs from the transmitted radio frequency by the amount of the intermediate frequency. In non-coherent radars, the transmitter signal and the local oscillator signal are generated from separate, independent frequency sources in contrast with coherent radars in which the transmitter signal and the local oscillator signal are generated from the same frequency source.

Since the radio frequency of the transmitted signals is controllably varied, the radio frequency of the local oscillator must also be frequency variable in the same manner as the frequency of the transmitted signals to maintain a constant intermediate frequency. Moreover, since the intermediate frequency must be within the bandwidth of a filter whose bandwidth is matched to the transmitter pulse width to achieve an optimum signal-to-noise ratio for the receiver, the radio frequency of the local oscillator must track the radio frequency of the transmitter output signal within predetermined limits.

The prior art mechanisms for controlling the local oscillator frequency of frequency agile pulse radars have included an electromechanical frequency transducer cooperating with a sample and hold circuit to provide a modulating signal which controls the radio frequency of the local oscillator output signal in response to the radio frequency of the next pulse to be provided by the transmitter. A manual adjustment is provided to control the gain of the modulating signal which is applied to the local oscillator for manually tuning the automatic frequency control mechanism. A fast automatic frequency control loop corrects for errors in the manually tuned modulating signal.

The basic problems with the prior art mechanism were that the manual gain adjustment for the modulating signal was accurate only for the mechanical and electrical transfer functions of the electromechanical frequency transducer and the sample and hold circuit which existed at the time at which the manual adjustment was made. However, these transfer functions were subject to variations due to mechanical wear, aging and ambient temperature variations. The fast automatic frequency control loop corrected the radio frequency of the local oscillator on a pulse-by-pulse basis. However, the accuracy of the correction depended on the various automatic frequency control loop parameters, and the error correction of the fast automatic control loop was found to be relatively sensitive to variations in loop gain parameters. Moreover, variation in the fast automatic control loop parameters would leave a residual correction error of a magnitude which depended on the magnitude of the modulating signal errors and on the automatic frequency control loop parameter variation. The residual error enhanced by the modulating signal errors and the sensitivity of the fast automatic frequency control loop to variations in gain parameters, necessitated frequent manual adjustment of the automatic frequency control and resulted in reliability performance and maintenance requirements which were unacceptable for some applications.

SUMMARY OF THE INVENTION

The present invention comprises a non-coherent, frequency agile pulse radar having a transmitter for transmitting radar pulses of controllably variable radio frequency, a local oscillator which provides a radio frequency signal which tracks the controllably variable signal of the transmitter, and a mixer for mixing the output signals of the transmitter and the local oscillator to provide a useful intermediate frequency signal. An average frequency control provides an average frequency signal which causes the average frequency of the local oscillator signal to track the average frequency of the transmitter signal. A frequency transducer monitors the radio frequency of the pulses provided by the transmitter, and a sample and hold circuit, which is responsive to the frequency transducer, amplifies and stores the voltage of the frequency transducer to provide a modulating signal which causes the frequency modulation of the local oscillator signal to track the frequency modulation of the transmitter signal. A modulation gain control loop is responsive to the voltage of the frequency transducer and also to a discriminator signal of the average frequency control for attenuating the modulating signal of the sample and hold circuit to compensate for variations in the transfer functions of the transducer and the sample and hold network.

The average frequency control loop includes an intermediate frequency amplifier, a discriminator, and a first slow integrator. The intermediate frequency amplifier amplifies the intermediate frequency signal obtained from mixing the output of the transmitter and local oscillator and provides this amplified intermediate frequency signal to the discriminator. The output of the discriminator is comprised of a pulse train at the transmitter pulse repetition frequency whose envelope varies at the transmitter signal modulation rate and forms the discriminator signal which is provided to the modulation gain control loop and also to the first slow integrator. The output of the first slow integrator controls the average value of the radio frequency of the local oscillator signal.

The modulation gain control includes a commutator, a second slow integrator, and a voltage variable attenuator. The commutator is responsive to the output of the frequency transducer and to the discriminator signal and serves to invert a selected portion of the discriminator signal in relation to polarity changes in the frequency transducer output. The output of the commutator is provided to the second slow integrator which controls the voltage variable attenuator in response to the average amplitude of the commutator output signal. The attenuator attenuates the modulating signal of the sample and hold circuit to correct for peak-to-peak errors in the modulating signal.

DESCRIPTION OF THE PREFERRED EMBODIMENT

Figure 1:
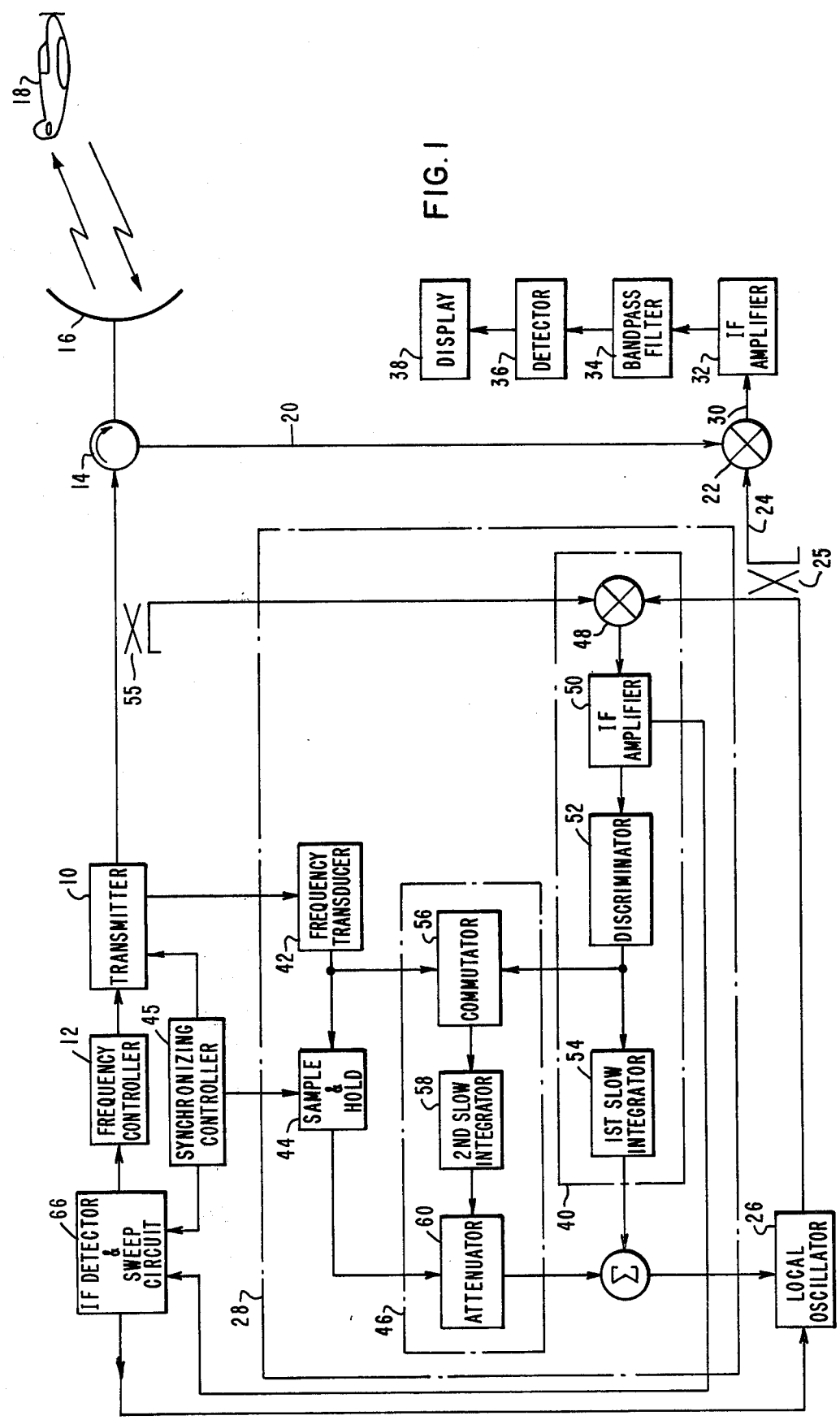
FIG. 1 is a block diagram of the disclosed frequency control for a non-coherent, frequency agile pulse radar.

FIG. 1 is a block diagram of a frequency agile pulse radar set which incorporates the herein disclosed, improved frequency control. In the frequency agile pulse radar, a transmitter 10 provides a radio frequency (RF) signal whose envelope forms a train of pulses having a predetermined repetition frequency ($F_r$). The RF frequency of the output signal of transmitter 10 is controllably varied at a frequency modulation rate ($F_m$) by a frequency controller 12. In practice, the transmitter 10 and the frequency controller 12 may be comprised of a microwave cavity and a diaphragm respectively. The transmitter output signal is delivered to a circulator 14 which then directs the signal to an antenna 16. From the antenna 16, the signal is propagated through the atmosphere towards a target 18 which reflects an echo of the transmitted signal back to antenna 16. The aspect angle of the target 18 might be such that at a given frequency the antenna 16 receives no return from the target, those returns being scattered by the target in other directions. However, due to the frequency modulation of the transmitter signal the radar set will detect the presence of the target regardless of its aspect angle.

The reflected echo which is received by antenna 16 is delivered to the circulator 14 and passes out of the circulator 14 along a channel 20 to a mixer 22 where it is mixed with a mixing radio frequency (RF) signal provided through a channel 24 and a directional coupler 25. As will be described later and in accordance with the present invention, the RF mixing signal of a local oscillator 26 is caused to track the RF of the transmitter signal by an automatic frequency control 28. The mixing of the echo signal received from the target 18 with the mixing signal of the local oscillator 26 in the mixer 22 provides a signal of intermediate frequency (IF) on a channel 30 which is more suitable for amplification and further processing than the RF signal comprising the echo signal received from the target. Typically, the IF signal in channel 30 is amplified by an IF amplifier 32 and then filtered in a bandpass filter 34 whose bandwidth is matched to the pulse width of the pulses comprising the transmitter output signal to achieve an optimum signal-to-noise ratio for the radar set. After the IF signal is filtered by the bandpass filter 34 it may be converted from frequency to voltage by a detector 36 and provided to a user device which is exemplified by a display 38. Since signal-to-noise considerations place definite limitations on the bandwidth of the bandpass filter 34, it is evident that the RF of the local oscillator mixing signal must remain at an IF frequency spectral distance from the RF of the received echo to within the tolerances of the bandwidth of the bandpass filter 34 for a useful IF signal to be provided by the radar set.

It is apparent that, neglecting doppler effects, the echo signal reflected by the target 18 and received by the antenna 16 will be the same RF pulse train which is provided by the transmitter 10. Recalling that the RF of the transmitter output signal is controllably modulated by the frequency controller 12, it will be recognized that the local oscillator output signal must also be controllably modulated in the same fashion if the RF of the local oscillator output signal is to remain the IF spectral distance from the RF of the received echo.

The automatic frequency control 28 is comprised of a controlling means which includes an average frequency control network 40; and a modulating means which includes the frequency transducer 12 operative with a sample and hold circuit 44, and a modulation gain control network 46. In the operation of the disclosed device, the output of the average frequency control network 40 corrects for long-term errors in the average RF of the local oscillator caused by temperature variations, wear of the components, and component aging. The frequency transducer 42 monitors the RF of the transmitter output signal on a pulse-by-pulse basis and provides a voltage indicative of the deviation of the RF from the average RF of the transmitter output signal to the sample and hold circuit 44 which, as well known in the art, typically includes a switch and a capacitor. In response to a signal from a synchronizing clock 45, the sample and hold circuit 44 amplifies and stores the output voltage of the frequency transducer 42 which represents the RF of the next pulse to be provided by the transmitter 10. Upon a second signal from the synchronizing clock 45 immediately prior to the firing of the transmitter pulse, the sample and hold circuit 44 operates through the modulation gain control network 46 to provide a modulation signal to the control port of the local oscillator 26 to cause the frequency modulation of the mixing signal of the local oscillator 26. The automatic frequency control 28 thereby causes the RF of the local oscillator mixing signal to substantially track the RF of the transmitter output signal at an IF spectral distance away from the transmitter output signal by tuning the RF of the local oscillator 26 to the RF of the next pulse to be provided by the transmitter 10.

Figure 2:
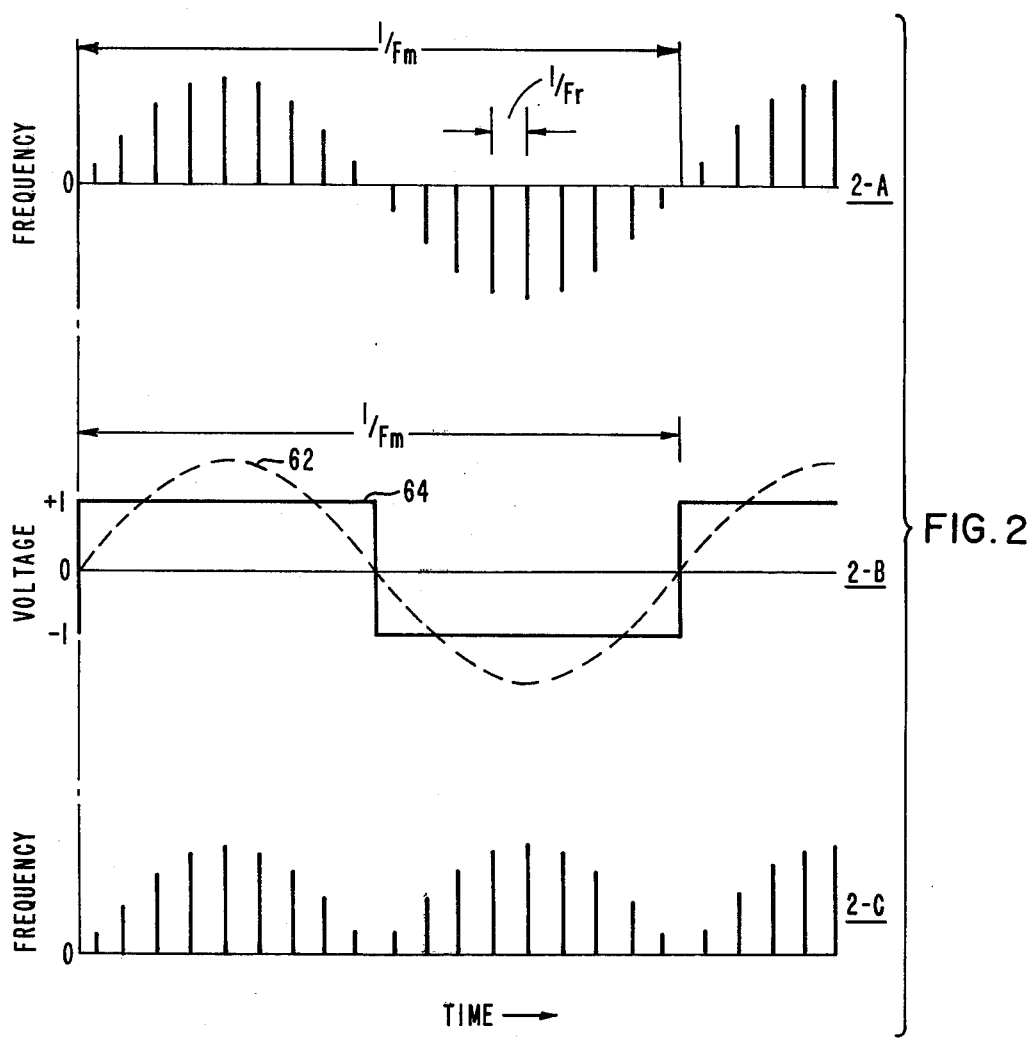
FIG. 2 represents exemplary waveforms produced by the discriminator, the frequency transducer, and the commutator during the operation of the present invention.

The average frequency control network 40 is similar to prior art frequency control networks used on non-agile pulse radar sets, and consists of a mixer 48, an intermediate frequency (IF) amplifier 50, a discriminator 52, and a first slow integrator 54. A portion of the local oscillator mixing signal and a portion of the transmitter signal provided through directional coupler 55 are mixed in the mixer 48 to the provide an IF signal which is amplified in IF amplifier 50 and provided to discriminator 52 which provides a voltage pulse whose amplitude and polarity is proportional to the frequency and sense of the IF signal provided by IF amplifier 50. For example, if the mixing signal of the local oscillator 26 is too low, the discriminator 52 would provide a positive voltage whose amplitude was proportional to the frequency of the IF signal. Likewise, if the mixing signal is too high, the discriminator 52 would provide a negative voltage with an amplitude proportional to the IF signal frequency. When the local oscillator 26 precisely tracks the transmitter frequency, no signal appears at the output of discriminator 52. Where there is periodic deviation between the local oscillator signal and the transmitter signal, the discriminator 52 provides a periodic output of a pulse train at the transmitter repetition frequency $F_r$ whose envelope has a period of the inverse of the transmitter signal modulation rate $1/F_m$. Waveform 2-A of FIG. 2 illustrates one example of a typical output signal of the discriminator 52 when there is periodic error between the local oscillator signal and the transmitter signal. The output of discriminator 52 is provided to the slow integrator 54 whose response is slower than either the transmitter repetition frequency $F_r$ or the transmitter signal modulation rate $F_m$ and provides an average frequency signal to the local oscillator 26 to establish the average frequency about which local oscillator 26 will modulate.

The output of the discriminator 52 is also provided to the modulation gain control network 46 to control the gain of the modulation signal provided by the sample and hold network 44. The modulation gain control network 46 adjusts the gain of the modulation signal provided by sample and hold circuit 44 to correct for peak-to-peak variation in the electrical and mechanical transfer functions of the frequency transducer 42 and the sample and hold circuit 44. The peak-to-peak variations in the mechanical and electrical transfer functions arise as a result of mechanical wear, aging and variations in the ambient temperature.

The modulation gain control network 46 is comprised of a commutator 56, a second slow integrator 58, and an attenuator 60. The commutator 56 is responsive to the output of discriminator 52 and also to the voltage output of frequency transducer 42. The commutator 56 operates to invert negative excursions of the pulse train of the discriminator 52 by controlling a unity gain factor in response to polarity changes in the output signal of the frequency transducer 42. For example, in waveform 2-B of FIG. 2, the dashed line 62 represents the output of the frequency transducer 42 and the solid line 64 represents the gain of the commutator 56 for the discriminator output of waveform 2-A. While the output signal of the frequency transducer 42 is at a first polarity which may be defined as positive, the gain of the commutator 56 is positive and the output of the discriminator 52 is not inverted while, when the polarity of the frequency transducer 42 is reversed, the gain of the commutator 56 is negative and the output of the discriminator 52 is inverted. For the signals of waveforms 2-A and 2-B, the output of the commutator 56 would appear as shown in waveform 2-C of FIG. 2. The output of the commutator 56 therefore has a constant component whose amplitude and sense is proportional to the average error in the modulation of the mixing signal. This constant component of the commutator output signal drives the slow integrator 58 which provides an attenuator control signal to change the attenuation of the attenuator 60 in the direction that reduces the average error between the frequencies of the local oscillator mixing signal and the transmitter signal due to variation in the electrical and mechanical transfer functions of the frequency transducer 42 and the sample and hold circuit 44.

The modulation gain control network 46 therefore serves to continually adjust the gain of the modulation signal to compensate for variations in electrical and mechanical transfer functions of the transducer and the sample and hold circuit 44. Since the average accuracy of the modulation signal is controlled automatically by the modulation gain control 46, the average frequency control 40 is not required to suppress errors from pulse-to-pulse or at the transmitter signal modulation rate, but controls only the difference between the long-term, average frequencies of the transmitter and local oscillator signals. The bandwidth of the average frequency control network 40 will, therefore, be unaffected by changes in the modulation signal gain parameters caused by ambient temperature variations, aging and component replacement.

A detector and sweep circuit 66 provides a means to establish stability of the automatic frequency control 28 both at the start-up of the radar set and in the event of transient disturbances. In such situations, the frequency modulation errors of the modulation gain control network 46 will exceed the dynamic range of the average frequency control 40 so that the average frequency control 40 will not establish an average RF frequency, thereby preventing the modulation gain control network 46 from controlling the gain of the modulation signal. To overcome this problem, the detector and sweep circuit 66, which is substantially the same as the detection and sweep circuit used in frequency agile radar sets of the prior art, senses the absence of IF pulses within the IF amplifier 50 and, upon the absence of such pulses, temporarily inactivates the frequency controller 12 and slowly sweeps the local oscillator 26 to the unmodulated RF frequency of the transmitter 10. Once the local oscillator 26 acquires the average frequency of the unmodulated output of the transmitter 10, the magnitude of the frequency modulation of the output of transmitter 10 is increased from zero to the maximum value by the frequency controller 12 at a rate within the dynamic range of the average frequency control network 40. After the maximum modulation of the transmitter signal is reached, the automatic frequency control 28 will maintain its stability until start-up or transient disturbance conditions are again experienced.

We claim:
1. A frequency agile pulse radar comprising:
a transmitter for transmitting a frequency modulated signal;
a local oscillator for generating a mixing signal;
means for controlling the average frequency of the local oscillator with respect to the average frequency of said modulated signal, said controlling means being responsive to the frequency modulated signal of said transmitter and to the mixing signal of said local oscillator to provide an average frequency signal to said local oscillator for controlling the average frequency of said mixing signal with respect to the average frequency of said modulated signal; and
means for modulating the average frequency of the local oscillator signal with respect to the modulation of said frequency modulated signal, said modulating means being responsive to the frequency modulation of said transmitter and the error of said mixing signal to determine the average error of said mixing signal with respect to said modulated signal.

2. The apparatus of claim 1 wherein said controlling means comprises:
means for mixing the frequency modulated signal of said transmitter with the mixing signal of said local oscillator to provide a mixing product signal, said mixing means being responsive to the frequency modulated signal of said transmitter and the mixing signal of said local oscillator;

an amplifier responsive to the mixing product of said mixing means;

a discriminator responsive to the output of said amplifier to provide an output signal having an amplitude proportional to the frequency of the output of said amplifier; and an integrator responsive to the output of said discriminator to provide an average frequency signal to said local oscillator for controlling the average frequency of said mixing signal with respect to the average frequency of said modulated signal.

3. The apparatus of claim 1 wherein said modulating means comprises:

a frequency transducer for providing an output signal in response to the frequency modulation of said transmitter signal;

a sample and hold circuit responsive to said frequency transducer, said sample and hold circuit amplifying the output of said frequency transducer to provide a modulating signal; and means for attenuating the modulating signal of said sample and hold circuit to control the frequency modulation of the average frequency of said local oscillator signal established by said controlling means.

4. The apparatus of claim 2 wherein said modulating means comprises:

a frequency transducer for providing an output signal in response to the frequency modulation of said transmitter signal;

a sample and hold circuit responsive to said frequency transducer, said sample and hold circuit amplifying the output of said frequency transducer to provide a modulating signal;

a commutator responsive to the output of said discriminator and to the output of said frequency transducer, said commutator inverting the output of said discriminator in relation to inversions in the polarity of the output of said frequency transducer to provide a commutator signal having a constant component whose magnitude and sense is proportional to the average modulation error in the mixing signal of said local oscillator;

a second integrator responsive to said commutator, said second integrator providing an attenuator control signal in response to the constant component of said commutator signal; and an attenuator responsive to said sample and hold circuit and to said second integrator to attenuate the modulating signal of said sample and hold circuit in response to the attenuator control signal of said second integrator, said attenuator providing an attenuated frequency modulation signal to said local oscillator to control the average error of said mixing signal with respect to said modulated signal.

5. A frequency agile pulse radar comprising:

a transmitter for transmitting a frequency modulated signal;

a local oscillator for generating a mixing signal;

an average frequency control responsive to the frequency modulated signal of said transmitter and to the mixing signal of said local oscillator, said average frequency control providing a discriminator signal of a pulse train whose envelope varies at the frequency modulation rate of said transmitter signal, said average frequency control also providing an average frequency signal for controlling the average frequency of the local oscillator signal with respect to the average frequency of the transmitter signal;

a frequency transducer for monitoring the frequency of the transmitter signal;

a sample and hold network responsive to said frequency transducer, said sample and hold network amplifying the output of said frequency transducer to provide a modulating signal prior to the transmission of the transmitter signal; and a modulation gain control responsive to said frequency transducer and to the discriminator signal of said average frequency control, said modulation gain control providing an output signal to the local oscillator, said output signal being an attenuation of the modulating signal with respect to the discriminator signal to compensate for variations in the modulating signal due to variations in the electrical and mechanical transfer functions of the transducer and the sample and hold circuit.

6. An improved frequency agile pulse radar that transmits a frequency agile output signal, and that is responsive to echos of the transmitted signal, said radar having a transmitter for transmitting frequency modulated signal pulses; a local oscillator for generating a mixing signal; a mixer for mixing the oscillator signal with echos of the transmitter signal to provide an intermediate frequency signal; and a filter responsive to said intermediate frequency signal to provide an output signal, said filter having a bandwidth substantially matched to the pulse width of the signal pulses of said transmitter signal; wherein the improvement comprises:

an average frequency control responsive to the frequency modulated signal of said transmitter and to the mixing signal of said local oscillator, said average frequency control providing a discriminator signal of a pulse train whose envelope varies in accordance with the frequency modulation rate of said transmitter signal, said average frequency control also providing an average frequency signal for controlling the average frequency of the local oscillator signal with respect to the average frequency of the transmitter signal;

a frequency transducer for monitoring the frequency of the transmitter signal;

a sample and hold circuit responsive to said frequency transducer, said sample and hold network amplifying the output of said frequency transducer to provide a modulating signal; and a modulation gain control responsive to said frequency transducer and to the discriminator signal of said average frequency control, said modulation gain control attenuating the modulating signal of the sample and hold circuit to provide an output signal to the local oscillator, said modulation gain control attenuating the modulating signal to compensate for variations in the gain of the frequency transducer and the local oscillator.

7. The apparatus of claim 6 wherein said modulation gain control comprises:

a commutator having a gain which alternates polarity in response to successive polarity inversions of the output of said frequency transducer signal to provide an output signal having an average value whose amplitude and sense is proportional to the average error in the modulation of said local oscillator signal;

an integrator for providing an attenuator control signal in response to the output of said commutator; and an attenuator for attenuating the modulating signal to said local oscillator in response to the attenuator control signal of said integrator to compensate for variations in the transfer functions of the transducer and the local oscillator.

8. A method for frequency modulating an oscillator of a radar set in response to the frequency modulation of the radar transmitter, said method comprising:

transmitting a frequency modulated signal from the transmitter;

mixing the transmitter signal and the oscillator signal to provide an intermediate frequency signal;

controlling the average frequency of the oscillator signal in response to the average frequency of said intermediate frequency signal; and determining the average value of the commutation of the intermediate frequency signal with respect to the frequency modulation of said transmitter;

modulating the average frequency of said oscillator in response to the frequency modulation of said transmitter and in response to the average value of the commutated intermediate frequency signal.

* * * * *